United States Patent [19]

Deiringer et al.

[11] Patent Number: 5,248,041
[45] Date of Patent: Sep. 28, 1993

[54] PROCESS FOR THE SEPARATION OF PLASTICS BY FLOTATION

[75] Inventors: Günther Deiringer, Kastl; Gerhard Edelmann, Hofheim am Taunus; Bernhard Rauxloh, Eberbach, all of Fed. Rep. of Germany

[73] Assignee: Hoechst Aktiengesellschaft, Frankfurt, Fed. Rep. of Germany

[21] Appl. No.: 811,472

[22] Filed: Dec. 20, 1991

[30] Foreign Application Priority Data

Sep. 14, 1991 [DE] Fed. Rep. of Germany ....... 4130709

[51] Int. Cl.$^5$ .................... B03D 1/02; B03D 1/002
[52] U.S. Cl. ................... 209/166; 209/167; 209/11; 241/DIG. 38; 521/46.5; 521/48; 521/48.5
[58] Field of Search .............. 209/3, 4, 9, 11, 166, 209/167; 241/19, 20, 24, DIG. 38, 21; 521/42.5, 43.5, 45, 46.5, 48, 48.5

[56] References Cited

U.S. PATENT DOCUMENTS

| | | | |
|---|---|---|---|
| 3,925,200 | 12/1975 | Izumi | 209/166 |
| 3,926,790 | 12/1975 | Izumi | 209/166 |
| 3,926,791 | 12/1975 | Izumi | 209/166 |
| 3,933,633 | 1/1976 | Saitoh | 209/166 |
| 3,941,688 | 3/1976 | Saitoh | 209/166 |
| 3,985,650 | 10/1976 | Saitoh | 209/166 |
| 4,040,949 | 8/1977 | Saitoh | 209/166 |
| 4,046,677 | 9/1977 | Saitoh | 209/166 |
| 4,132,633 | 1/1979 | Saitoh | 209/166 |
| 4,167,477 | 9/1979 | Valdez | 209/166 |
| 4,617,111 | 10/1986 | Grimm | 209/167 |
| 5,120,768 | 6/1992 | Sisson | 521/44 |

FOREIGN PATENT DOCUMENTS

| | | |
|---|---|---|
| 0291959 | 11/1988 | European Pat. Off. . |
| 2511347 | 9/1975 | Fed. Rep. of Germany . |
| 2218353 | 9/1974 | France . |
| 2643011 | 8/1990 | France . |
| 1444831 | 8/1976 | United Kingdom ............. 209/166 |

OTHER PUBLICATIONS

Bahr, A., *Erzmetall* 33:324–330 (1980)-No Translation.
*Modern Plastics*:pp. 15–22 (Jun. 1990).
E. Sisson et al, "Selective Surfactant (Froth) Flotation of Plastics", Goodyear Tire & Rubber Co., Davos Recycle '92 International Forum, Davos, Switzerland, Apr. 7–10, 1992, pp. 2/4-1 to 2/4-17.

*Primary Examiner*—Thomas M. Lithgow
*Attorney, Agent, or Firm*—Connolly & Hutz

[57] ABSTRACT

The invention relates to a process for separating off polyester plastics from a mixture of polyester, polyvinyl chloride and, if present, other plastics, wherein in the flotation the polyester remains as the residue and the polyvinyl chloride and, if present, other plastics are recovered in floated form, which comprises treating the mixture of plastics with an aqueous alkaline solution and separating off the polyester from polyvinyl chloride and, if present, other plastics by flotation.

12 Claims, No Drawings

PROCESS FOR THE SEPARATION OF PLASTICS BY FLOTATION

DESCRIPTION

The invention relates to a process for separating off polyester plastics from a mixture of polyester, polyvinyl chloride and, if present, other plastics by flotation.

The attempt to reduce the amount of garbage by reutilizing plastics contained in garbage has led to the development of various, mostly physical separation processes.

A number of processes are known in which plastics of different density can be separated, such as, for example, the separation of plastics by means of sink-float processes or by means of cyclones/hydrocyclones (Albert Behr, Erzmetall 33 (1980), pp. 324–330). However, these processes do not work in the case of mixtures of plastics having approximately the same density, such as, for example, polyester and polyvinyl chloride plastics. It is precisely the sorting of polyester and polyvinyl chloride plastics which is of great interest, since these plastics, as they are likely to be collected, have to be separated into the individual grades, as far as possible, in order to make the material available for high-quality reuse.

There are a number of existing processes for the separation of polyester and polyvinyl chloride plastics.

However, the so-called hot-rolling process (Modern Plastics, June 1990, pp. 15–22) does not work with plastics made of amorphous polyester, since, under the operating conditions, they soften in a temperature range similar to that of polyvinyl chloride.

In FR-A-2 643 011, a milling and screening process is known in which the different breaking behavior of plastics leads to concentration of one plastic, for example in the coarse fraction, but not to complete separation. However, incomplete separation results in poor material properties in the recycled plastic. Thus, a polyvinyl chloride content in the polyester of as little as 1% leads to a dark color and embrittlement of products produced therefrom, since polyvinyl chloride burns at the processing temperature of the polyester, which is above 260° C. On the other hand, a low polyester content in the polyvinyl chloride leads to flaws in the recycled plastic, since the polyester content present does not melt at the processing temperature of the polyvinyl chloride and thus does not form a composite.

It is true that polyester and polyvinyl chloride plastics can be separated after detection of the polyvinyl chloride using X-rays (EP-A-0 291 959), but such a separation only makes sense if the articles to be sorted do not fall below a minimum size, such as that of bottles for beverages, since otherwise the equipment required becomes too complicated.

Although a process for the separation of a mixture of a polystyrene and a polyolefin such as polyethylene and polypropylene or a mixture of polyethylene and polypropylene by flotation is disclosed in DE-A-2,511,347, a process for the separation of a mixture of polyester, polyvinyl chloride and, if present, other plastics by flotation is, however, not disclosed.

Surprisingly, it has been found that polyester plastics can be easily separated off from a mixture of polyester, polyvinyl chloride and, if present, other plastics by treating the mixture of plastics before flotation with an aqueous alkaline solution.

The invention relates to a process for separating off polyester plastics from a mixture of polyester, polyvinyl chloride and, if present, other plastics, which comprises treating the mixture of plastics with an aqueous alkaline solution and separating off the polyester from polyvinyl chloride and, if present, other plastics by flotation.

When a mixture of polyester, polyvinyl chloride and, if present, other plastics is used, the surface of the polyester can be made more hydrophilic than that of the other plastics in an aqueous alkaline solution. In the flotation which follows, the polyester is obtained as the residue, while the other plastics are made to float to the surface of the liquid (reverse flotation).

The polyesters which can be separated off according to the invention include, for example, plastics made of polyethylene terephthalate, polybutylene terephthalate, acid-modified polyesters and glycol-modified polyesters, such as Kodar ® PETG (manufactured by Kodak-Pathe, Paris). Examples of other suitable plastics are those made of polystyrene, polyethylene or polypropylene.

The plastics used are the abovementioned types of plastics, which are comminuted to give a form suitable for flotation. The origin of the plastics used is immaterial. Thus, for example, films, fibers, cables, nonwovens, knitted fabrics or also shaped articles, such as bottles, can be used.

There is no specific limit to the size and form of the plastic pieces used; for reasons of handling, the size of the plastics used is about 20 mm or less, preferably about 5–10 mm. This size of the plastics used is obtained by converting the abovementioned plastics into plastic pieces of the abovementioned size by means of conventional comminution processes, such as chopping, cutting, chipping or tearing and, if desired, by also using them for the flotation in the form of granules or slices.

The mixture of polyester, polyvinyl chloride and, if present, other plastics is treated before the flotation in a prior conditioning step with an aqueous alkaline solution. This is done by exposing the mixture of plastics to the aqueous alkaline solution over a period of about 2 minutes to 15 minutes, if desired with stirring. It has been shown that the time of exposure to a 10 % by weight aqueous alkaline solution is in the range from 5 to 15 minutes. The aqueous alkaline solution is in general used at room temperature, for example at 20° to 30° C., or as a hot solution, for example at 30° to 60° C. During the conditioning process, care should be taken that the plastic pieces used are covered by aqueous alkaline solution.

The aqueous alkaline solutions used are in particular solutions of alkaline earth metal oxides or alkali metal oxides, alkaline earth metal hydroxides or alkali metal hydroxides, alkaline earth metal carbonates or alkali metal carbonates, or alkaline earth metal bicarbonates or alkali metal bicarbonates. Preferably, solutions of alkali metal hydroxides, particularly preferably sodium hydroxide solutions, are used.

The aqueous alkaline solution is used in the form of an at least 2% by weight, preferably 10% by weight, solution.

The plastics content in the aqueous alkaline solution is about 1 to 30 parts by weight, preferably 5 to 15 parts by weight, relative to 100 parts by weight of the aqueous alkaline solution.

The ratio of the proportions of polyester to polyvinyl chloride and, if present, to other plastics is in the range from 1–99 % by weight of polyester to 99–1 % by weight of polyvinyl chloride to 0–98 % by weight of other plastics.

It is recommended that the mixture of plastics removed from the aqueous alkaline solution after the treatment using aqueous alkaline solution, for example by screening, so as to minimize the consumption of aqueous alkaline solution and prevent the solution from being carried over to the flotation cell. After screening, the conditioned mixture of plastics is introduced into a flotation cell. Flotation cells which can be used are those known from ore, paper and wastewater flotation. The plastics are suspended in the cells in an aqueous solution, in which the proportion of plastics is about 2 to 10 parts by weight, relative to 100 parts by weight of aqueous solution. The aqueous solution is in general water, although it is also possible to use salt-containing water. Examples of suitable salt water are seawater, brines, bitter water (magnesia-containing water) and also aqueous solutions containing halides and/or sulfates.

A flotation agent is added to his aqueous suspension. The flotation agents added can be flotation froth-forming agents or the mixture of a flotation froth-forming agent and a collecting agent.

Suitable flotation froth-forming agents are aliphatic and cycloaliphatic alcohols having 5 to 10 carbon atoms, such as 2-ethylhexanol, polyglycols having a molecular weight (weight average) of 200 to 500, such as polypropylene glycol and alkylpolyglycol ethers having a molecular weight of 200 to 500 in the form of reaction products of aliphatic $C_1$-$C_8$-alcohols with $C_2$-$C_4$-$\alpha$-olefin oxides, such as Flotanol ® D14 (manufactured by Hoechst AG).

Suitable collecting agents are the hydrophobic and water-insoluble collecting agents known from coal flotation. These include natural oils, such as vegetable oils and mineral oils having a chain length of 8 to 20 carbon atoms or also fatty acids, in particular carboxylic acids having 8 to 20 carbon atoms. Suitable mixtures are composed of the abovementioned flotation froth-forming agents and collecting agents, in which the ratio of flotation froth-forming agent to collecting agent is in the range from 1 to 9 to 9 to 1, preferably 1 to 1.

The amount of flotation froth-forming agent or of a mixture of flotation froth-forming agent and collecting agent is in the range from 100 to 3000 grams, relative to one metric ton of the mixture of plastics.

After addition of the flotation froth-forming agent, the suspension is allowed to take effect for a few minutes and flotation is then carried out. Conditioning and flotation are carried out by processes known per se in flotation technology.

After flotation is complete, the foam product (concentrate) and the chamber product (residue) are isolated in a suitable manner, and the liquor is recycled into the process. The foam product and chamber product can be recovered in a simple manner by screening or centrifuging.

According to the invention, the residue is composed of the polyester which has been separated off.

The mutual impurity level of the plastics or mixtures of plastics obtained is less than 0.2 % by weight.

The purity of the plastics obtained can be tested by suitable, mostly analytical procedures. In the case of plastics of different color, it is sufficient to test the purity by optical means. In the case of plastics of the same color, the purity is tested by chemical means using the conventional procedures, for example by selective dissolution of the plastics. When determining the purity by selective dissolution, the solvents used, for example dichloroacetic acid, are those in which only the polyester present is dissolved. This makes it possible to determine the polyester content in the foam product and in the chamber product.

The present invention is illustrated by the examples below.

EXAMPLE 1

100 ml of a 10 % by weight sodium hydroxide solution are added to a mixture of 14.5 g of polyvinyl chloride (red-colored) and 6 g of polyethylene terephthalate (colorless) in the form of chopped film of between 2 and 6 mm in size, and the mixture is conditioned for 5 minutes.

The mixture of plastics is then removed from the aqueous alkaline solution by screening and suspended in a 2 l flotation cell containing 1900 ml of water, and 250 g of the flotation agent Montanol 531 ® (manufactured by Hoechst AG), relative to one metric ton of the mixture of plastics, are added to the mixture, which is then conditioned for one minute. After conditioning, flotation is carried out using known processes.

This gives 14.5 g of a concentrate, while 6 g remain in the residue. Separation into polyvinyl chloride and polyester is virtually complete. The purity of the plastics of different color is tested by optical means. The mutual impurities are less than 0.2 % by weight.

COMPARATIVE EXAMPLE 1

Analogously to Example 1, but omitting the pretreatment of the mixture of plastics with aqueous alkaline solution. No separation takes place. The entire mixture of plastics is discharged.

EXAMPLE 2

Analogously to Example 1

2000 g, relative to one metric ton of the mixture of plastics, of 2-ethylhexanol as the alcoholic froth-forming agent and 1000 g, relative to one metric ton of the mixture of plastics, of sunflower oil are used for flotation. Separation into polyvinyl chloride and polyester (residue) is virtually complete as in Example 1.

EXAMPLE 3

Analogously to Example 1

2000 g, relative to one metric ton of the mixture of plastics, of tetrapropylene glycol methyl ether as the froth-forming agent and 1000 g, relative to one metric ton of the mixture of plastics, of sunflower oil are used for flotation. Separation into polyvinyl chloride and polyester is virtually complete as in Example 1.

We claim:

1. A process for separating off polyester plastic from a plastics mixture containing polyester and polyvinyl chloride plastics, which comprises:

treating the plastics mixture with a sufficient amount of an aqueous alkaline solution to render the polyester plastic more hydrophilic than the polyvinyl chloride plastics, suspending and subjecting to froth flotation the thus-treated plastics mixture in a flotation zone, said froth flotation being carried out in the presence of at least one flotation froth-forming agent and a collecting agent comprising natural oils having a chain length of 8 to 20 carbon atoms or fatty acids having 8 to 20 carbon atoms, said at least one flotation froth forming agent being present with said collecting agent in a ratio range of from 9:1 to 1:9, whereby the polyester remains as the residue and the polyvinyl chloride becomes recoverably in froth floated form as a foam product, and separating off the polyester from the polyvinyl chloride by isolating the residue and the foam product.

2. The process as claimed in claim 1, wherein the proportion of the plastics mixture in the aqueous alkaline solution during the treating of the plastics mixture with the aqueous alkaline solution is about 1 to 30 parts by weight, relative to 100 parts by weight of the aqueous alkaline solution.

3. The process as claimed in claim 2, wherein said proportion of the plastics mixture in the aqueous alkaline solution is about 15 to 25 parts by weight, relative to 100 parts by weight of the aqueous alkaline solution.

4. The process as claimed in claim 1, wherein the aqueous alkaline solution is the solution of an alkaline earth metal oxide or alkali metal oxide, alkaline earth metal hydroxide or alkali metal hydroxide, alkaline earth metal carbonate or alkali metal carbonate or alkaline earth metal bicarbonate or alkali metal bicarbonate.

5. The process as claimed in claim 4, wherein the aqueous alkaline solution is an at least 2% by weight solution.

6. The process as claimed in claim 4, wherein the aqueous alkaline solution is a 5-15% by weight solution.

7. The process as claimed in claim 1, wherein said at least one flotation froth-forming agent is selected from the group consisting of alcohols, polyglycols, polyglycol esters and alkylpolyglycol ethers and the collecting agent is selected from mineral oils having a chain length of 8 to 20 carbon atoms.

8. The process as claimed in claim 1, wherein the plastics mixture comprises polyester plastic, polyvinyl chloride plastic and at least one plastic other than polyester or polyvinyl chloride plastic, and said plastic other than polyester or polyvinyl chloride plastic is recovered in froth floated form.

9. The process as claimed in claim 8, wherein in the plastics mixture the proportions of polyester, polyvinyl chloride and at least one plastic other than polyester or polyvinyl chloride plastic are in the following ranges: 1-99% by weight of polyester, 99-1% by weight of polyvinyl chloride, and 0-98% by weight of said at least one plastic other than polyester or polyvinyl chloride plastic.

10. The process as claimed in claim 1, wherein the polyester present in the plastics mixture is at least one of polyethylene terephthalate, polybutylene terephthalate, acid-modified polyester and glycol-modified polyester.

11. The process as claimed in claim 10, wherein in the plastics mixture the proportions of polyester and polyvinyl chloride are in the following ranges: 1-99% by weight of polyester and 99-1% by weight of polyvinyl chloride.

12. The process as claimed in claim 1, wherein the amount of flotation froth-forming agents and collecting agent is in the range of 100 to 3000 grams per metric ton of the plastics mixture.

* * * * *